(12) United States Patent
Jordan, Sr. et al.

(10) Patent No.: US 7,135,060 B2
(45) Date of Patent: Nov. 14, 2006

(54) PARTICLE COLLECTION APPARATUS AND METHOD

(75) Inventors: John L. Jordan, Sr., Hanahan, SC (US); John L. Jordan, Jr., Mt. Pleasant, SC (US)

(73) Assignee: Enviromental Monitoring Systems, Inc., Charleston, SC (US)

( * ) Notice: Subject to any disclaimer, the term of this patent is extended or adjusted under 35 U.S.C. 154(b) by 11 days.

(21) Appl. No.: 10/723,980

(22) Filed: Nov. 26, 2003

(65) Prior Publication Data

US 2004/0107837 A1 Jun. 10, 2004

Related U.S. Application Data

(63) Continuation of application No. 09/974,682, filed on Oct. 10, 2001, now Pat. No. 6,692,553.

(51) Int. Cl.
*G01N 1/00* (2006.01)
*G01N 1/24* (2006.01)
(52) U.S. Cl. .............................. 96/413; 55/435; 55/465; 73/863.22
(58) Field of Classification Search .................. 96/413; 55/435, 462, 465; 73/28.01, 28.05, 863.21, 73/863.22
See application file for complete search history.

(56) References Cited

U.S. PATENT DOCUMENTS

| | | | |
|---|---|---|---|
| 3,741,001 A | * | 6/1973 | Fletcher et al. ............ 73/28.05 |
| 3,949,594 A | | 4/1976 | Treaftis et al. |
| 3,957,469 A | | 5/1976 | Nebash |
| 3,966,439 A | | 6/1976 | Vennos |
| 4,321,822 A | | 3/1982 | Marple et al. |
| 4,524,811 A | * | 6/1985 | Taylor ........................ 141/325 |
| 4,606,232 A | | 8/1986 | Prodl |
| 4,670,135 A | | 6/1987 | Marple et al. |
| 4,725,294 A | | 2/1988 | Berger |
| 4,796,475 A | | 1/1989 | Marple |
| 4,961,916 A | * | 10/1990 | Lesage et al. ................. 422/88 |
| 4,972,957 A | | 11/1990 | Liu et al. |

(Continued)

FOREIGN PATENT DOCUMENTS

JP 63-075639 A * 4/1988

OTHER PUBLICATIONS

Marple, Virgil A. and Willeke, Klaus, Impactor Design, Mechanical Engineering Department, University of Minnesota, Minneapolis, MN, Apr. 6, 1976.

*Primary Examiner*—Frank M. Lawrence
(74) *Attorney, Agent, or Firm*—Moore & Van Allen PLLC; Michael G. Johnston

(57) ABSTRACT

A particle collector comprises a housing defining an enclosed chamber. An inlet opening in the housing provides fluid communication between a source of gas and particles and the chamber and an outlet opening provides fluid communication between the chamber and the exterior of the housing. The outlet opening is connected to a pump for drawing gas and particles through the housing from the inlet opening to the outlet opening. A collecting member having an adhesive on at least a portion of the surface is disposed in the chamber between the inlet opening and the outlet opening. The adhesive surface of the collecting member is positioned adjacent to the inlet opening. When gas and particles are drawn through the housing, the inlet opening directs a stream of gas and particles at the surface of the collecting member. Particles having an aerodynamic equivalent diameter of less than about 2.5 μm are captured.

24 Claims, 8 Drawing Sheets

U.S. PATENT DOCUMENTS

| | | |
|---|---|---|
| 5,201,231 A | 4/1993 | Smith |
| 5,304,125 A * | 4/1994 | Leith .......................... 604/57 |
| 5,693,895 A | 12/1997 | Baxter |
| 5,783,756 A | 7/1998 | Xiong et al. |
| 6,101,886 A | 8/2000 | Brenizer et al. |
| 6,463,814 B1 * | 10/2002 | Letarte et al. ........... 73/863.22 |
| 6,692,553 B1 | 2/2004 | Jordan, Sr. et al. |
| 2002/0066321 A1 * | 6/2002 | Lagraff et al. ........... 73/863.22 |

* cited by examiner

PARTICLE COLLECTION APPARATUS AND METHOD

CROSS-REFERENCES

This application is a continuation application of U.S. patent application Ser. No. 09/974,682, filed Oct. 10, 2001, now U.S. Pat. No. 6,692,553, the contents of which are incorporated herein by reference.

The present invention relates generally to an apparatus and method for collecting particles suspended in a gas and, more particularly, to a sampling apparatus and method for collecting particulate matter for counting and analysis.

The detection of airborne particulate matter, including fibers, pollen, mold and fungal spores, insect parts, flora and other bioaerosols, and the like, is a continuing and expanding area of development for minimizing health risks to populations. Environmental professionals need to determine the presence and quantity of deleterious particles, such as asbestos fibers, in the air. Aerobiologists and allergists need to identify and quantify airborne pollen and mold spore concentrations for patient diagnosis. Epidemiologists are concerned with particles carrying bacteria, such as that responsible for Legionnaires Disease in air conditioning systems. Moreover, federal and industrial standards have been established for allowable concentrations of particular matter in the atmosphere of various environments. As a result, it is necessary to regularly test some environments to determine the concentration of particles in the atmosphere for maintaining a particular standard or self-regulating quality control.

Devices for sampling airborne particulate matter generally include a housing having inlet and outlet openings, a pump for drawing a gas flow through the housing, and a separator within the housing for collecting particles from the sampled gas. In a conventional sampling device, referred to as an "impactor", the separator is a flat "impaction plate", usually a microscope slide. In use, a flow of sampled gas comprising, for example, air and particles carried by the air, is drawn through the impactor. The flow is directed through the inlet opening in the housing and toward the impaction plate. The stream of gas is diffused radially outwardly at the impaction plate surface and flows around the impaction plate. Particles in the gas stream larger than a certain size have high enough inertia to cross streamlines and impinge upon the impaction plate and are separated from the gas stream. Since the particles tend to bounce when they hit the impaction plate, the impaction plate surface is coated with an adhesive. Smaller particles remain in the gas stream and pass out of the housing through the outlet opening. Upon completion of sampling, the impaction plate is manually removed from the impactor for microscopic inspection, weighing or chemical analysis of the collected particles.

Collection efficiency of an impactor is a measure of the percent of particles which are collected on the impaction plate as a function of the particle size. The collection efficiency is usually reported as the smallest particle collected at 50% efficiency. This is known within the art as the 50% cut-off size ($d_{50}$). The size range of the particles collected on the impaction plate, and the $d_{50}$, is a function of the diameter of the inlet opening and the distance of the impaction plate from the opening, which is referred to as the jet-to-plate distance. These parameters are reported as a dimensionless ratio, S/W, where S is the jet-to-plate distance and W is the diameter of the inlet opening of the impactor.

The 50% cut-off size is dependent upon S/W. Generally, as S/W decreases, the impactor's collection efficiency of smaller particles increases.

Collection of smaller airborne particulate such as mold and fungal spores and other bioaerosols has recently become a priority. Efficient mold and fungal spore collection requires a sampling device with a $d_{50}$ of less than about 2 μm. To achieve this collection efficiency, the tendency is to reduce the S/W of the impactor. In practice, however, when S/W is less than one, conventional impactor performance becomes unpredictable yielding inconsistent results. Thus, it has been suggested that the minimum jet-to-plate distance for an impactor should provide an S/W equal to one or greater. In this configuration, small variations in jet-to-plate distance will not effect the value of $d_{50}$. Unfortunately, impactors designed and operated according to these accepted parameters cannot efficiently collect particles below about 2.5 μm. and thus are inadequate for smaller particulate collection.

Another important characteristic of impactors is the gas sampling flow rate. The flow rate through the impactor must be calibrated prior to sampling in order to accurately calculate the sampling results. With conventional impactors, the flow rate through the pump is typically calibrated using a rotameter upstream of the pump. However, because the pump is spatially removed from the actual particle collection site at the impaction plate, the calibrated flow rate at the pump may not be the same as the flow rate at the point of impaction. This can lead to inaccurate sampling results.

For the foregoing reasons, there is a need for a particle collection apparatus and method for the collection of airborne particulate below about 2.5 μm. The new apparatus should be designed for sampling airborne particles in various environments and applications, including environmental air quality, industrial and occupational monitoring. The new apparatus should also allow for accurate calibration of the gas sampling flow rate at the point of impaction.

SUMMARY

According to the present invention, an apparatus and system is provided for collecting particles entrained in a gas from a source of gas and particles. The apparatus and system comprise a housing defining an enclosed chamber. The housing has an inlet opening providing fluid communication between the source of gas and particles and the chamber, and an outlet opening providing fluid communication between the chamber and the exterior of the housing. The outlet opening is connected to a fluid flow producing means for drawing gas and particles through the housing from the inlet opening to the outlet opening. A collecting member having an adhesive on at least a portion of the surface is disposed in the chamber between the inlet opening and the outlet opening. The adhesive surface of the collecting member is positioned adjacent to the inlet opening so that the ratio of the distance between the inlet opening and the collecting member surface to the diameter of the inlet opening is less than about 1. When gas and particles are drawn from the source through the housing, the inlet opening directs a stream of gas and particles at the surface of the collecting member. Particles carried in the stream having an aerodynamic equivalent diameter of less than about 2.5 μm are captured on the collecting member.

Also according to the present invention, a method is provided for collecting particles having an aerodynamic equivalent diameter of less than about 2.5 μm. The method comprises the steps of providing a housing defining an enclosed chamber. The housing has an inlet opening providing fluid communication between a source of gas and particles and the chamber, and an outlet opening providing fluid communication between the chamber and the exterior of the housing. The outlet opening is connected to a fluid flow producing means for drawing gas and particles through the housing from the inlet opening to the outlet opening. A collecting member is provided and at least a portion of the upper surface of the collecting member is coated with an adhesive. The collecting member is positioned in the chamber between the inlet opening and the outlet opening so that the ratio of the distance between the inlet opening and the surface of the collecting member to the diameter of the inlet opening is less than about 1. Gas and particles are drawn from the source and through the housing so that the inlet opening directs the gas and particles at the surface of the collecting member for capturing the particles on the surface of the collecting member.

BRIEF DESCRIPTION OF THE DRAWINGS

For a more complete understanding of the present invention, reference should now be had to the embodiments shown in the accompanying drawings and described below. In the drawings:

FIGS. 9A, 9B and 9C show the particle collection efficiency of an embodiment of an apparatus according to the present invention for oleic acid particles, polystyrene latex particles and two fungal spore species at three S/W ratios.

DESCRIPTION

Certain terminology is used herein for convenience only and is not to be taken as a limitation on the invention. For example, words such as "upper," "lower," "left," "right," "horizontal," "vertical," "upward," and "downward" merely describe the configuration shown in the FIGs. Indeed, the components may be oriented in any direction and the terminology, therefore, should be understood as encompassing such variations unless specified otherwise.

Figure 1:
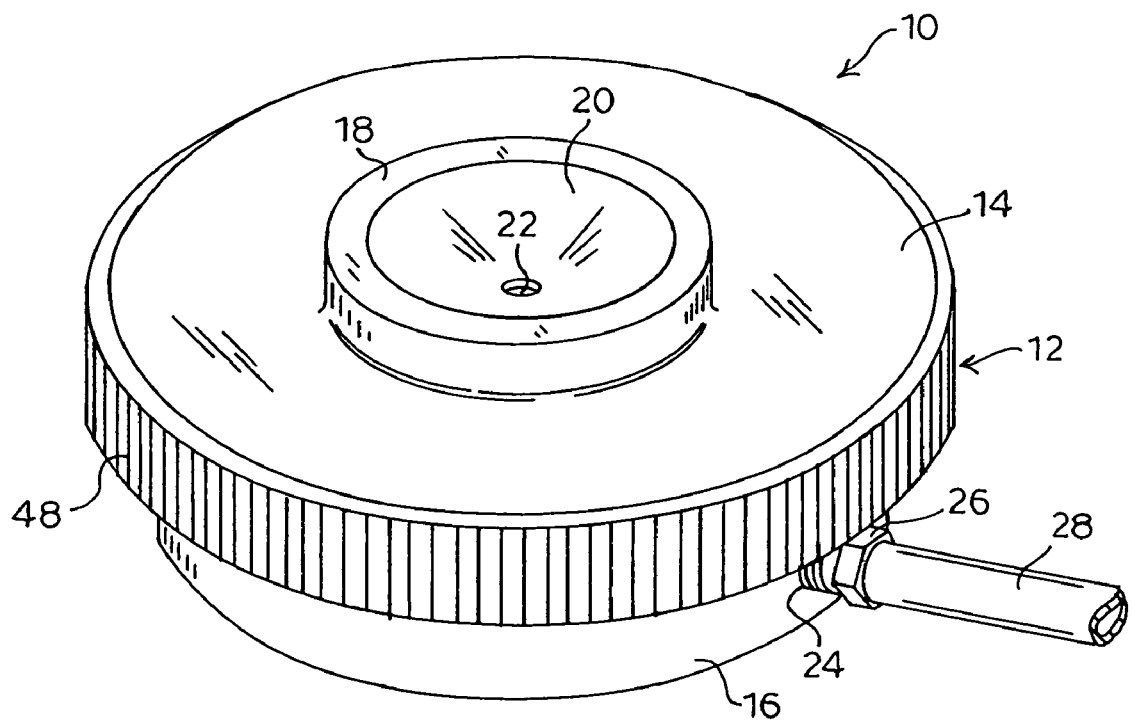
FIG. 1 is a perspective view of an embodiment of an apparatus for collecting particles entrained in a gas according to the present invention.
Figure 2:
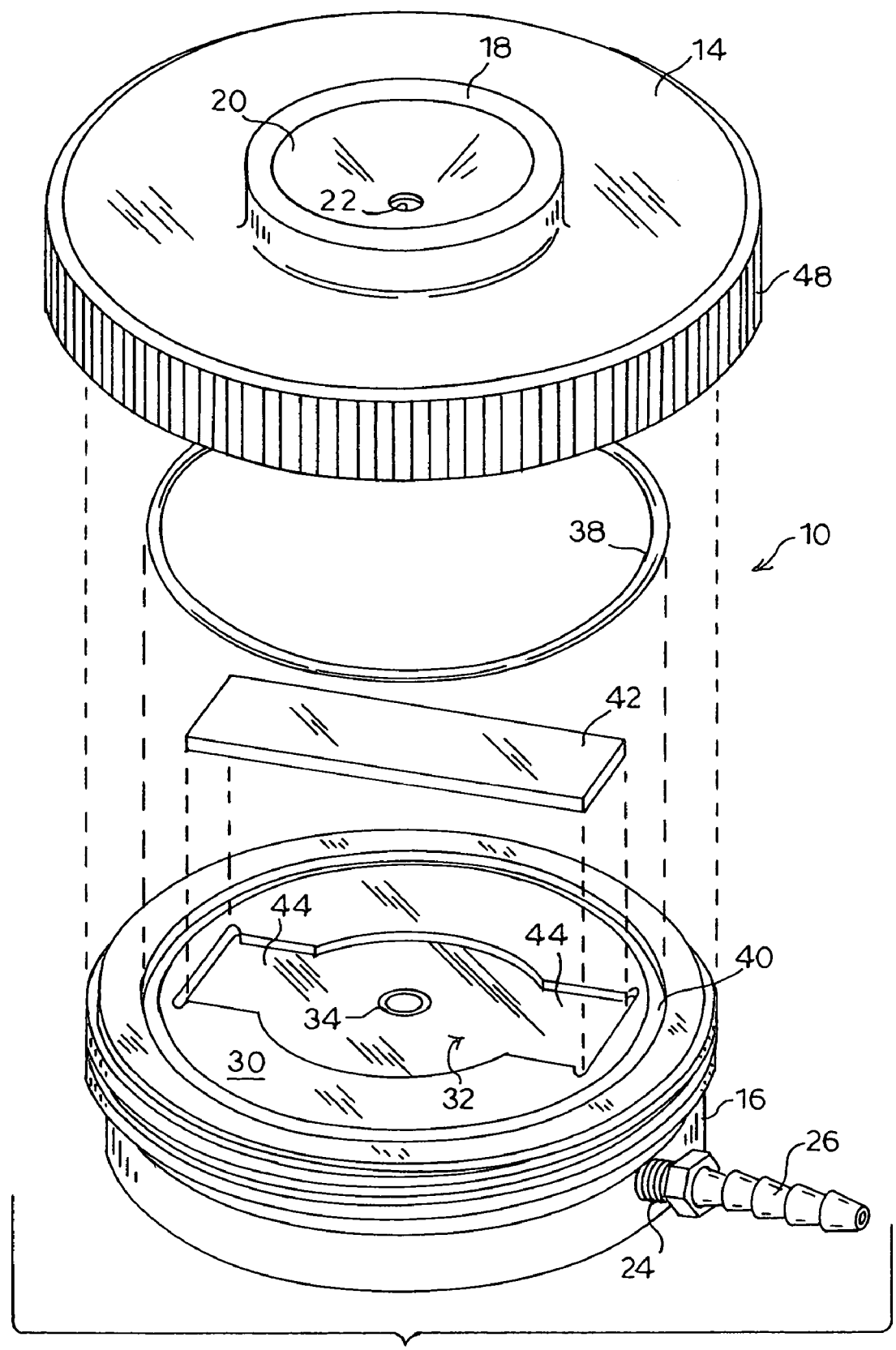
FIG. 2 is an exploded perspective view of the particle collection apparatus as shown in FIG. 1.
Figure 3:
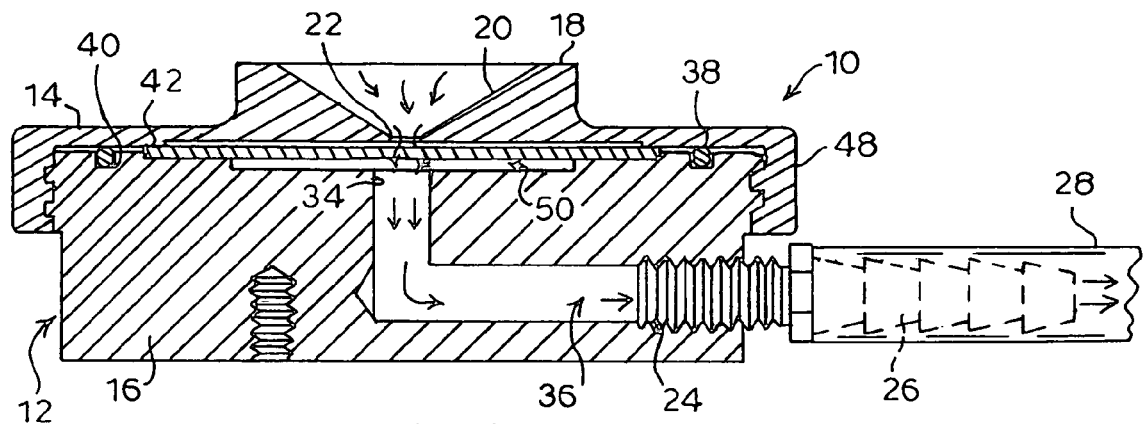
FIG. 3 is an elevational sectional view of the particle collection apparatus shown in FIG. 1.
Figure 4:
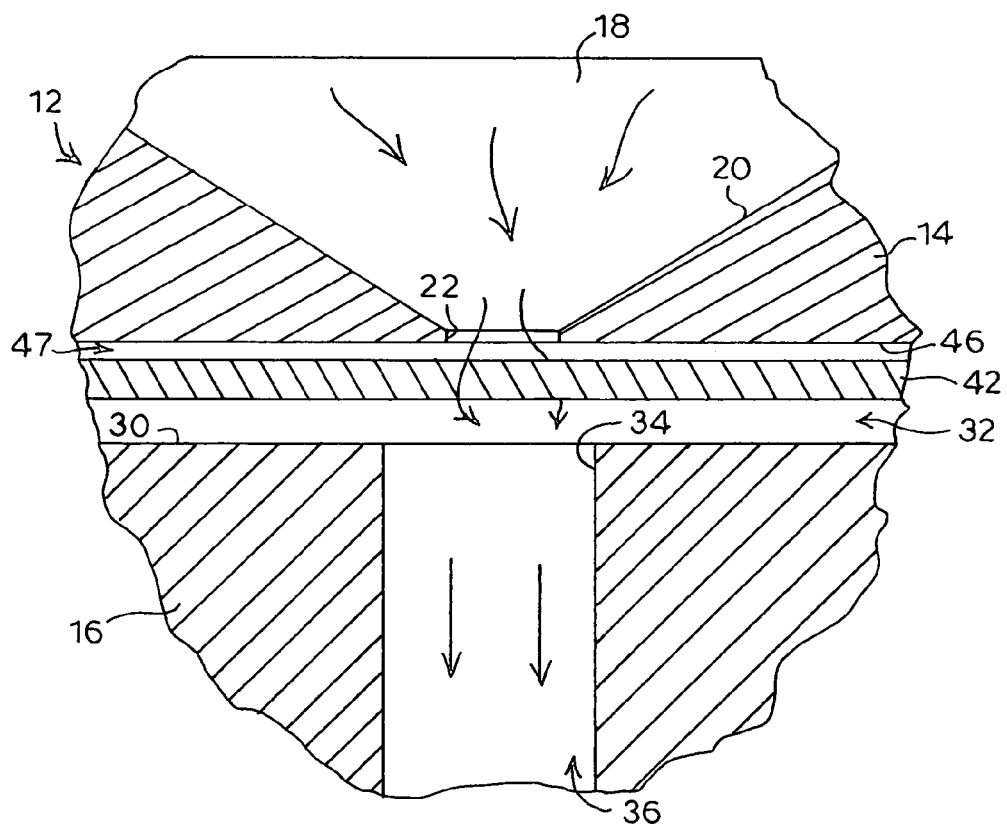
FIG. 4 is a close-up view of the area adjacent the inlet opening of the particle collection apparatus as shown in FIG. 3.

Referring now to the drawings, wherein like reference numerals designate corresponding or similar elements throughout the several views, an embodiment of a particle sampling apparatus according to the present invention is shown in FIG. 1 and generally designated at 10. The sampling apparatus 10 includes a cylindrical housing assembly 12 consisting of an upper, top member 14 and a lower, base member 16. The top member 14 has an integral, cylindrical protuberance 18 projecting upwardly from the top surface and defining a tapered, or conical, inlet passage 20. The wall of the inlet passage 20 tapers smoothly down at an angle of about 15° to about 30° to a circular inlet opening 22 in the top member 14. A corresponding outlet port 24 is provided in the base member 16 allowing for the flow of gas through the housing 12. A male hose barb fitting 26 in the outlet port 24 receives one end of an elongated flexible tube 28. The other end of the tube 28 is connected to a conventional vacuum pump, not shown, which is used to draw gas through the housing 12.

The cylindrical shape of the housing 12 is preferred for convenience and ease in manufacture and use, although any other exterior shape may be used if desired. The housing 12 is preferably made of aluminum, but may be formed from any suitable material such as, for example, thermoplastics. The housing 12 can be formed by machining, stamping, injection molding, and the like.

Referring now to FIG. 2, the base member 16 of the housing 12 has a flat upper surface 30 having a central, cylindrical recess 32. The floor of the recess 32 has a circular outlet opening 34 into an outlet passage 36 (FIG. 3) which passes downwardly and then transversely through the base member 16 and opens through the outlet port 24 in the sidewall of the base member 16. An o-ring 38 is disposed in an annular groove 40 spaced from the periphery of the upper surface 32 of the base member 16. Alternatively, the o-ring 38 could be similarly positioned in the top member 14.

An impaction plate 42 is seen in FIG. 2, comprising a flat, rectangular member. A microscope slide is particularly advantageous for use as the impaction plate 42 since the particles collected are usually microscopically analyzed. Opposed rectangular slots 44 are provided in the surface 30 of the base portion 16 adjacent the recess 32. The ends of the impaction plate 42 are received in the slots 44 so that the impaction plate is suspended over the recess 32. The depth of the slots 44 is such that the upper surface of the impaction plate 42 is above the upper surface 32 of the base member 16. The width of the impaction plate 42 is less than the diameter of the recess 32 so that a peripheral gas passageway exists around the impaction plate and into the recess 32. If desired, other means for supporting the impaction plate 42 may be provided so long as the impaction plate is held in place adjacent the inlet opening 28 above the upper surface 32 of the base member 16 and gas flow is permitted around the impaction plate 42. For example, a plurality of pegs may be provided extending from the inner surface 46 of the top member 14 or the upper surface 30 of the base member 16, which serve to hold the plate 42 in place when the housing 12 is closed. Alternatively, the impaction plate 42 could lie directly on the surface 30 of the base member 16 and be held in place by the joined top 14 and bottom 16 portions of the housing assembly 12.

The top member 14 of the housing 12 has an internally-threaded downwardly depending peripheral flange 48. A length of the outer peripheral surface of the base member 16 is externally threaded for receiving the top member 14. When the housing 12 is assembled (FIG. 3), the o-ring 38 is compressed against the inner surface 46 of the top portion 14 thereby forming a seal which prevents air leaks at the interface between the top member 14 and base member 16. Other types of releasable fasteners can be used to assemble the housing 12, such as wing nuts, screws, bolts, and the like, passing through suitable holes in the periphery of the housing 12 spaced from the o-ring 38.

As seen in FIGS. 3 and 4, a shallow recess 47 is formed in the inner surface 46 of the top member 14. When assembled, the housing 12 defines an interior chamber 50 bounded by the walls of the recess 32 in the base member 16 and the recess 47 in the inner surface 46 of the top member 14. The chamber 50 is sufficiently sized to meet the gas flow rate requirements of the sampling apparatus 10. The diameter of the recess 47 is less than the length of the impaction plate 42 so that a portion of the inner surface 46 of the top member 14 engages the ends of the impaction plate 42 for retaining the plate in position in the slots 44. Thus, the distance of the inlet opening 22 in the top member 14, which opens into the chamber 50 directly above the center of the impaction plate 42, is selected according to the depth of the recess 47. A layer of clear adhesive, not shown, is applied to the surface of the impaction plate 42 facing the inlet opening 28 for capturing particular matter entering the housing 12 that impinges against the plate 42. Typical adhesives suitable for use in this application include high impact grease, pressure sensitive adhesive tape, permanently tacky resins, and the like.

In operation, the vacuum pump operates to draw gas and particulate matter through the housing 12. The flow of gas and particles is indicated by the arrows in FIGS. 3 and 4. The gas and particles are drawn from the ambient atmosphere and enter the inlet passage 20. The gas moves down the inlet passage 20, through the inlet opening 22 and into the chamber 50 in the housing 12. The flow of the stream of gas is in a direction substantially axial to the inlet passage 20 and perpendicular to the impaction plate 42, although it is understood that turbulence may be induced by the inlet passage 20. The impaction plate 42 blocks straight through flow of gas and particulate matter between the inlet opening 22 and outlet opening 34. The gas stream is diffused radially outwardly from the center of the impaction plate 42. Inertia causes particles with sufficient mass to impinge upon the surface of the plate 42. The gas stream and particles which are not impacted pass around the edges of the plate 42 into the recess 32, through the outlet opening 34 in the floor of the recess 32 into the outlet passage 36 and out of the outlet port 24. After a predetermined period of time, the pump is stopped, the housing 12 disassembled and the impaction plate 42 removed from the housing 12 for analysis. A new impaction plate 42 is reassembled within the housing assembly 12 for subsequent sampling.

According to the present invention, the particle collection apparatus 10 preferably collects particles having a diameter less than about 2.5 μm. In order to achieve these results, the ratio of the jet-to-plate distance, S (FIG. 4), to the diameter of the inlet opening 22, W, is selected to be less than about 1 in order to collect particles less than about 2.5 μm. Further, the S/W can be arranged to efficiently collect particles as small as 0.5 μm but, depending upon the sampling environment, this could lead to sample overload which cannot be accurately counted under a microscope. Preferably, the S/W is about 0.5. More preferably, the S/W is about 0.1 which yields an efficiency curve which consistently yields a $d_{50}$ of less than about 2 μm.

In one embodiment of the present invention, the user may select from among several different top portions 14 each with the same inlet opening 28 diameter but differing recess 47 depths. Thus, the user may selectively determine the jet-to-plate distance by utilizing a top portion 14 with the appropriate recess 47 depth. By selection of a top portion 14 with a known recess 47 depth, the user can configure an impactor having a known S/W for selecting the size of the particles collected by the apparatus 10. For collecting particles having a diameter less than about 2.5 μm, the perferred jet-to-plate distance is less than about 0.08 inches, and the more preferred jet-to-late distance is about 0.02 inches or less. Thus, as an example, for an S/W of about 1, an inlet opening diameter of about 0.02 inches is required. An S/W of 0.1 or less would require an inlet opening diameter of about 0.2 inches or less.

Figure 5:
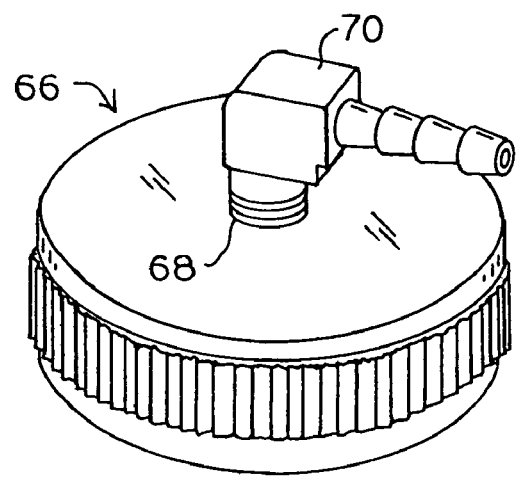
FIG. 5 is a perspective view of an embodiment of an apparatus for calibrating the particle collection apparatus shown in FIG. 1.
Figure 6:
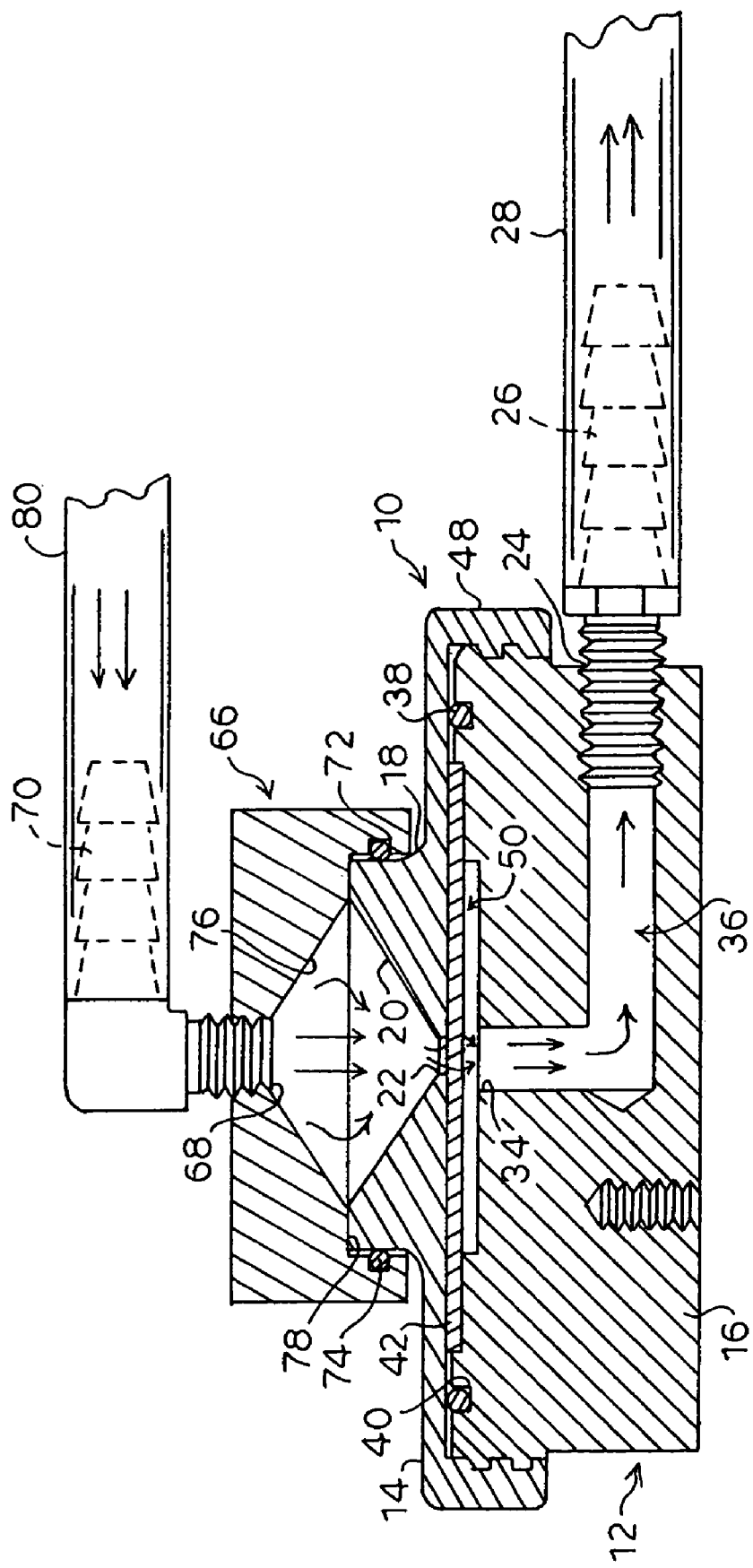
FIG. 6 is an elevational sectional view of the calibration apparatus shown in FIG. 5 in position on the particle collection apparatus.

Further in accordance with the present invention, FIG. 5 shows a cylindrical cap 66 which may be formed from the same material as the housing 12. The cap 66 has a central inlet opening 68 for threadably receiving a male hose barb fitting 70. As seen in FIG. 6, the cap 66 is designed to fit over the protuberance 18 on the top member 14 of the housing 12. The inner diameter of the cap 66 is slightly greater than the circumference of the protuberance 18 so that the cap 66 fits tightly over the protuberance 18. An annular groove 72 is provided in the cap 66 for seating an o-ring 74 for sealing the interface between the cap 66 and protuberance 18. The cap 66 defines an outwardly tapered inlet passage 76 which terminates in a circumferential shoulder 78 which seats against the upper surface of the protuberance 18.

In one embodiment, the cap 66 is used to calibrate the gas flow rate through the particle collection apparatus 10 prior to use. In this application, the fitting 70 on the cap 66 is connected to a metering device, not shown, by means of a flexible tube 80. Note that the impaction plate 42 does not have an adhesive surface in this function. The pump is operated for drawing gas through the housing 12 including the cap 66 (FIG. 6) and the flow rate is calibrated according to methods known in the art. The cap 66 design and location allows determination and calibration of the gas flow rate at the point of particle impaction. This calibration method for the gas flow rate enhances sampling integrity by assuring calibration is accurate at both the pump and the impaction point. In a preferred embodiment, the metering device is an NIST-certified primary standard for determining the flow rate.

Figure 7:
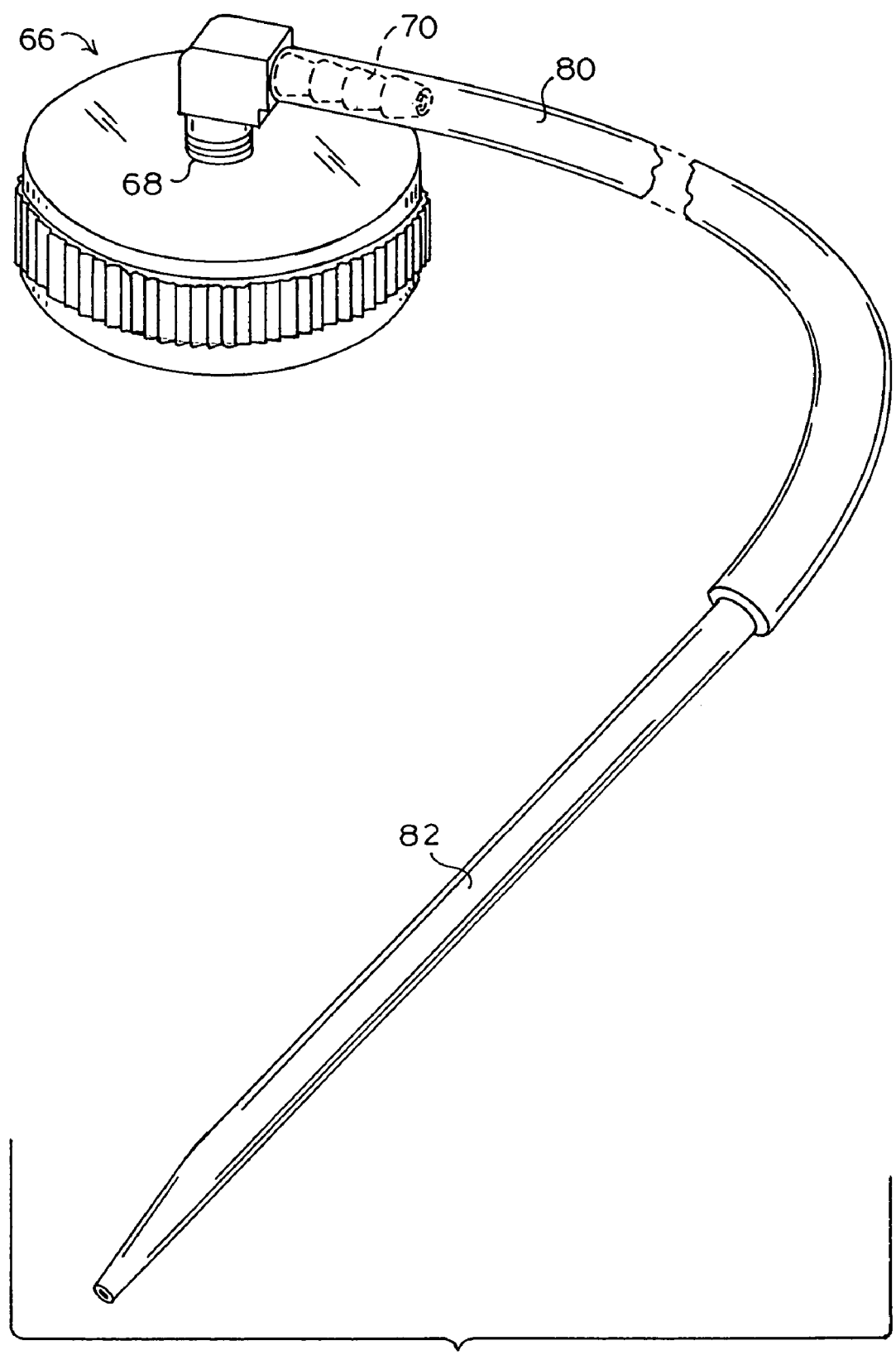
FIG. 7 is a perspective view of another embodiment of an apparatus for collecting particles according to the present invention.

In another embodiment, a tubular wand 82 (FIG. 7) may be attached to the free end of the tube 80 connected to the cap and used to draw gas and particle samples from areas inaccessible to, or inconvenient for use of, the apparatus 10. For example, the wand 82 can draw samples from walls, curtains, carpets, in the manner of a vacuum cleaner, or from cracks and other confined areas such as inner walls.

The particle collection apparatus 10 and method of the present invention is capable of effective, repeatable collection of particulate matter smaller than collected by conventional impactors. Moreover, the apparatus 10 may be used under a variety of conditions, in any desired location including confined areas such as ventilation ducts, and in any orientation. Since the tube 28 connected between the outlet port 24 and the pump may be any length, the pump may be placed at any selected location remote from the sampling site. Where great variation in tube 28 lengths is anticipated, a variable speed vacuum pump can be used so that gas flow losses due to friction and very long tubes can be accommodated providing substantially uniform air flow through the system 10.

The particle collection efficiency of several embodiments of the apparatus of the present invention 10 was demonstrated using a test system schematically shown in FIG. 8. Test aerosols comprising oleic acid or polystyrene latex (PSL) particles were generated by a Collison nebulizer 54 manufactured by BGI Inc., of Waltham, Mass. The test aerosols were diluted with HEPA-filtered compressed air, $Q_{DIL}$. The diluted aerosol passed through a 10-mCi $^{85}$Kr electrostatic charge equilibrator 56 manufactured by TSI Inc., Model 3012, of St. Paul, Minn., and into an aerosol chamber 58 housing an embodiment of the sampling apparatus 10 of the present invention. The aerosol particles were alternately sampled upstream and downstream of the sampling apparatus 10. The upstream aerosol concentration, $C_{UP}$, and the downstream aerosol concentration, $C_{DOWN}$, were measured by an aerodynamic particle size spectrometer 60 manufactured by Amherst Process Instruments, of Hadley, Mass., and sold under the trade name Aerosizer. The spectrometer 60 was operated at a flowrate, $Q_{AER}$, of 5.1 Lpm. When $C_{up}$ was measured, the spectrometer's 60 inlet was arranged to have a similar configuration as the inlet of the sampling apparatus 10. The sampling lines 64 used for $C_{up}$ and $C_{down}$ measurements were both 30 cm long so that particle losses in these lines, if present, were the same. Since the sampling flow rate of 20 Lpm was greater than $Q_{AER}$, the extra air was bypassed, $Q_{BYPASS}$, and monitored by a mass flow meter 62.

Using the particle size distribution data measured upstream and downstream of the sampling apparatus 10, the overall particle collection efficiency, $E_C$, was determined as follows:

$$E_C = \left(1 - \frac{C_{DOWN}}{C_{UP}}\right) \times 100\% \quad (1)$$

This efficiency is equal to the actual physical collection efficiency of the apparatus 10 if the internal losses are negligible. During each test sequence, the measurement of particle concentrations $C_{DOWN}$ and $C_{UP}$ was repeated three times for each specific configuration of the apparatus 10. Using these data the average value of the collection efficiency and the standard deviation were calculated. A new glass microscope slide was installed as the impaction plate for each test run.

Figures 9A, 9B:
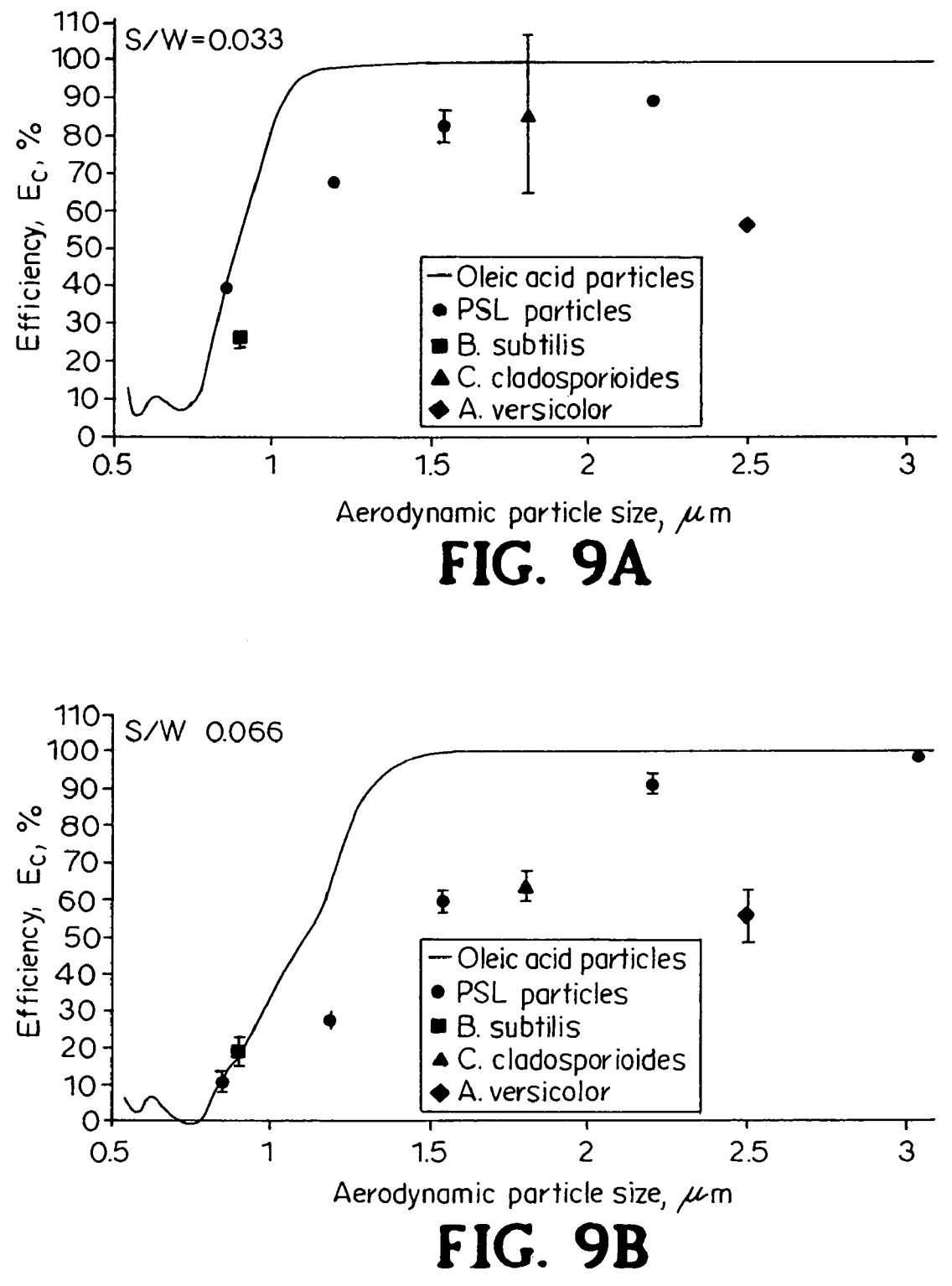
Figure 9C:
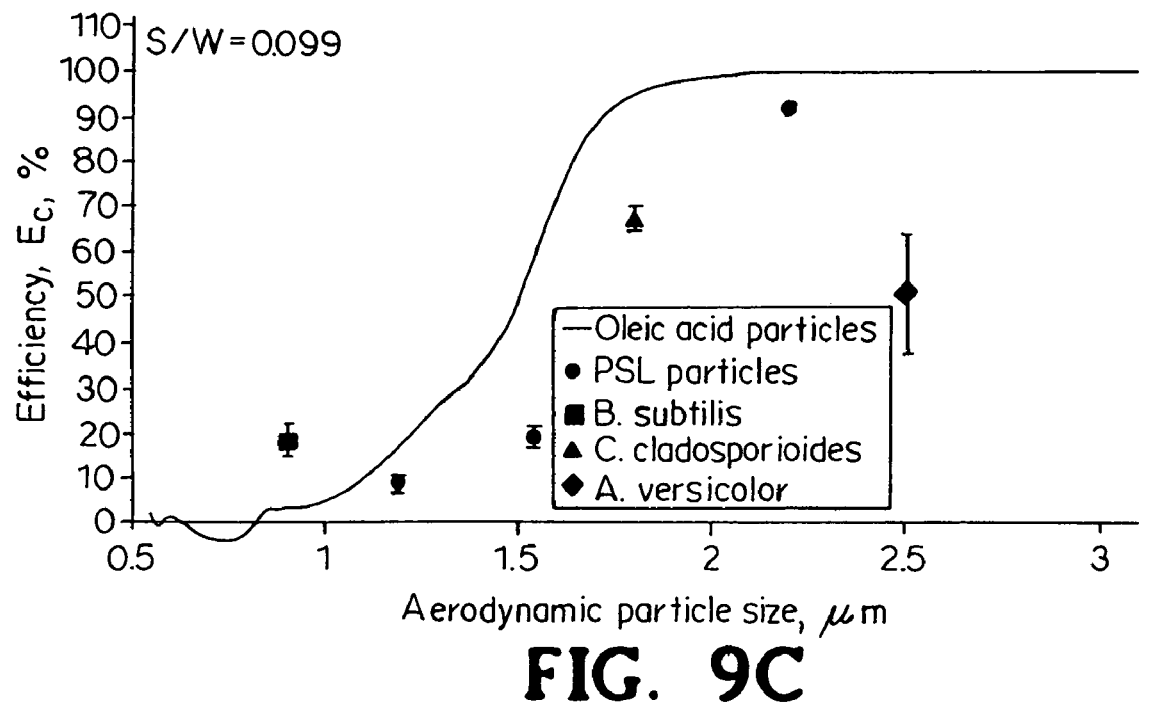

Three different configurations of the apparatus of the present invention 10 were tested. The diameter of the inlet opening for all four configurations was 0.182". The jet-to-plate distance was varied resulting in an S/W for each configuration of 0.033 (FIG. 9A), 0.066 (FIG. 9B) and 0.099 (FIG. 9C), respectively. FIGS. 9A–9C present the particle collection efficiency for the three configurations of the apparatus 10 when collecting polydisperse oleic acid particles and monodisperse PSL particles at a flow rate of 20 Lpm. Table 1 shows the cutoff sizes, $d_{50}$, of the apparatus 10, which decreased with decreasing S/W.

TABLE 1

| Sampling Apparatus Configuration | Particle Collection Efficiency ($d_{50}$) | |
|---|---|---|
| S/W | Oleic acid particles | PSL particles |
| 0.033 | 0.86 µm | 1.0 µm |
| 0.066 | 1.12 µm | 1.4 µm |
| 0.099 | 1.5 µm | 1.75 µm |

The collection of PSL particles was less efficient than collection of oleic acid particles of the same size, which may be attributed a "bounce effect" of the PSL particles. Oleic acid particles are very sticky and adhere well to the adhesive surface of the impaction plate 42. The PSL particles do not adhere well to the impaction plate 42 and may be re-aerosolized even after they are impacted, thereby contributing to the downstream particle count. Moreover, larger PSL particles impact with force sufficient to "splash" the coating of the surface rendering the plate surface less sticky for subsequent incoming particles. This effect may be more pronounced for higher particle concentrations.

All configurations achieved a particle collection efficiency below 2.5 µm when collecting oleic acid particles and PSL particles. This overall collection efficiency is sufficiently high to anticipate that airborne fungi will also be collected efficiently, subject to particle bounce effect and internal losses. Accordingly, the experimental system was modified to determine the spore collection efficiency of the apparatus 10 with two species of fungal spores, *Cladosporium cladosporioides* ($d_{ae}$=1.8 um) and *Asperigillus versicolor* ($d_{ae}$=2.5 um). These microorganisms commonly occur in indoor and outdoor environments in various climate zones worldwide. Prior to the experiments, *C. cladosporioides* and *A. versicolor* were cultured in dispersion tubes containing malt extract agar (MEA), and were then incubated at 25° C. for 7 days. The dispersion tubes were inserted into an agar-tube disperser for dry spore generation, as previously described by Reponen, T., K. Willeke, V. Ulevicius, A. Reponen, S. A. Grinshpun, and J. Donnelly, *Techniques for Dispersion of Microorganisms Into Air*, Aerosol Science and Technology, 27:405–421 (1997). The Collison nebulizer was replaced with a bioaerosol generator 54 which generated fungal spores from the agar-tube dispersers by passing HEPA-filtered air through the disperser. The fungal spores were not charge neutralized. The upstream and downstream aerosol concentrations were measured using an optical particle counter from Grimm Technologies, Inc. (Model 1.108), of Douglasville, Ga., operated at a flow rate of 1.21 Lpm.

Equation (1) was used to calculate the efficiency of the apparatus. This efficiency represented the fraction of particles of a given size that were captured by the apparatus 10, irrespective of the location of their collection, but did not account for internal losses. Counting the number of spores collected on a slide ($C_{SLIDE}$) and then comparing this number with spore concentration upstream of the sampler ($C_{UP}$), the actual collection efficiency was calculated as follows:

$$E_{Cmicroscope} = (1 - C_{SLIDE}/C_{UP}) \times 100\%, \quad (2)$$

The difference between the collection efficiencies $E_C$ and $E_{Cmicroscope}$ represents the particle losses inside the impactor. Therefore, $E_{Cmicroscope}$ is a more accurate performance characteristic for evaluating a bioaerosol sampler.

Figure 8:
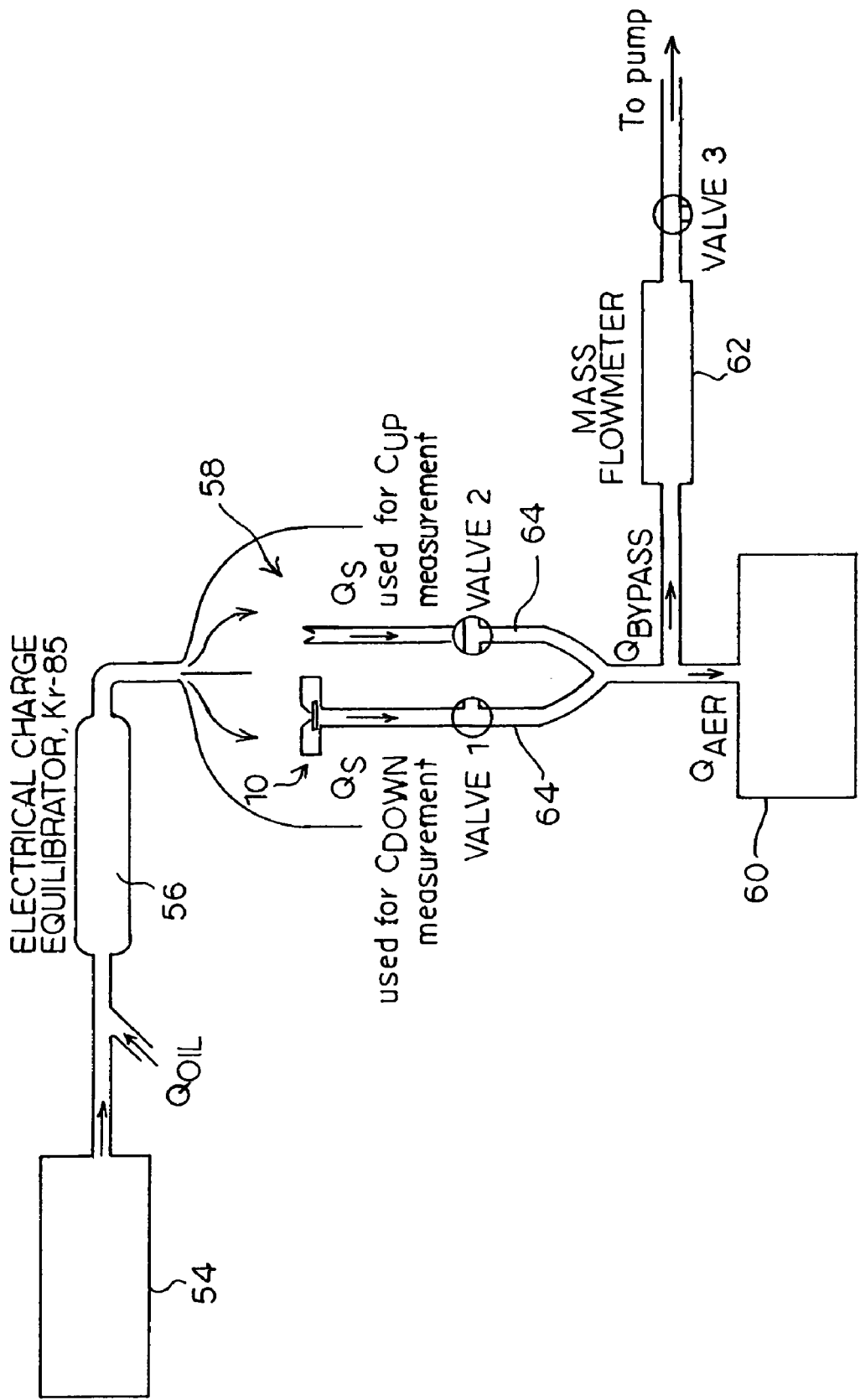
FIG. 8 is a schematic of an experimental system for testing particle collection efficiency of an impactor.

The collection efficiencies of the fungal spores for each configuration is presented in FIGS. 9A–9C. All three configurations were found adequate to collect both species of fungal spores with the actual efficiencies exceeding 50%. The highest collection efficiency was achieved with the apparatus having the lowest S/W (FIG. 8A). The differences between the overall capture efficiencies including internal losses, using the optical particle counter measurements of equation (1) and the actual collection efficiencies based on the microscopic counting of the impaction plate, equation (2), were statistically insignificant when collecting *C. cladosporioides* spores. For *A. versicolor*, the overall capture efficiency was somewhat higher than the collection efficiency based on the microscopic counting. One possible explanation may be that the spores of *A. versicolor* are released as single spores and agglomerates. It is known that *A. versicolor* can release chains of up to 60–80 spores. The agglomerates impact on the impaction plate and may break up into smaller particles or fragments. Some of these particles remain on the impaction plate surface, while the others are re-aerosolized and may collect inside the housing. These internal losses contribute to the collection efficiency obtained from optical particle count readings which outnumber the actual collection efficiency based on microscopic slide counting. This may also explain why the actual collection efficiency of *A. versicolor* was slightly lower than *C. cladosporioides* although *A. versicolor* spores are larger and thus had higher inertia and should have impacted more efficiently.

Although the present invention has been shown and described in considerable detail with respect to only a few exemplary embodiments thereof, it should be understood by those skilled in the art that we do not intend to limit the invention to the embodiments since various modifications, omissions and additions may be made to the disclosed embodiments without materially departing from the novel teachings and advantages of the invention, particularly in light of the foregoing teachings. Accordingly, we intend to cover all such modifications, omissions, additions and equivalents as may be included within the spirit and scope of the invention as defined by the following claims. In the claims, means-plus-function clauses are intended to cover the structures described herein as performing the recited function and not only structural equivalents but also equivalent structures. Thus, although a nail and a screw may not be structural equivalents in that a nail employs a cylindrical surface to secure wooden parts together, whereas a screw employs a helical surface, in the environment of fastening wooden parts, a nail and a crew may be equivalent structures.

We claim:

1. An apparatus for collecting particles entrained in a gas from a source of gas and particles, the apparatus comprising:
   a housing defining an enclosed chamber, the housing having an inlet opening providing fluid communication between the source of gas and particles and the chamber, and an outlet opening providing fluid communication between the chamber and the exterior of the housing, the outlet opening adapted to be connected to a fluid flow producing means for drawing gas and particles through the housing from the inlet opening to the outlet opening; and
   a collecting member disposed in the chamber in the housing between the inlet opening and the outlet opening, the collecting member having an upper surface, at least a portion of the upper surface coated with an adhesive and positioned adjacent to the inlet opening so that the ratio of the distance between the inlet opening and the adhesive-coated surface to the diameter of the inlet opening is less than about 0.1,
   such that, when gas and particles are drawn from the source of gas and particles and through the housing, the inlet opening directs the gas and particles at the adhesive-coated surface of the collecting member for capturing particles on the collecting member.

2. A particle collecting apparatus as recited in claim 1, wherein the housing comprises a first portion for sealingly connecting to a second portion, each of the first and second portions having an inner surface defining a recess, the inlet opening and outlet opening opening into the recess in the first portion and second portions, respectively, and the walls of the first and second portions defining the recesses forming the chamber when the first and second portions are sealingly connected, the longest planar dimension of the recesses at the inner surface of the first and second portions being less than the longest dimension of the collecting member so that the inner surfaces of the first and second portions engage the collecting member at two spaced points.

3. A particle collecting apparatus as recited in claim 1, further comprising a cap member having a pass through opening, the cap member adapted to be sealingly connected to the housing so that the pass through opening is in fluid communication with the inlet opening in the housing.

4. A particle collecting apparatus as recited in claim 1, wherein the distance between the inlet opening and the surface of the collecting member is less than about 0.02 inches.

5. A particle collecting apparatus as recited in claim 1, wherein the diameter of the inlet opening is less than about 0.2 inches.

6. A system for collecting particles from a source of gas and particles, the system comprising:
   a housing defining an enclosed chamber, the housing having a circular inlet opening providing fluid communication between the source of gas and particles and the chamber, and an outlet opening providing fluid communication between the chamber and the exterior of the housing;
   means for producing a fluid flow, the outlet opening adapted to be connected to the fluid flow producing means for drawing gas and particles from the source and through the housing from the inlet opening to the outlet opening;
   a collecting member disposed in the chamber in the housing between the inlet opening and the outlet opening, the collecting member having an upper surface, at least a portion of the upper surface coated with an adhesive and positioned adjacent to the inlet opening so that the distance between the inlet opening and the adhesive-coated surface of the collection member is less than about 0.08 inches and the ratio of the distance between the inlet opening and the adhesive-coated surface to the diameter of the inlet opening is less than about 1; and
   a cap member having a pass through opening, the cap member adapted to be sealingly connected to the housing so that the pass through opening is in fluid communication with the inlet opening in the housing,
   such that, when gas and particles are drawn from the source and through the cap member and housing, the inlet opening directs the gas and particles at the adhesive-coated surface of the collecting member for capturing particles on the surface of the collecting member.

7. A system for collecting particles from a source of gas and particles, the system comprising:
   a housing defining an enclosed chamber, the housing having a circular inlet opening providing fluid communication between the source of gas and particles and the chamber, and an outlet opening providing fluid communication between the chamber and the exterior of the housing;
   means for producing a fluid flow, the outlet opening adapted to be connected to the fluid flow producing means for drawing gas and particles from the source and through the housing from the inlet opening to the outlet opening; and
   a collecting member disposed in the chamber in the housing between the inlet opening and the outlet opening, the collecting member having an upper surface, at least a portion of the upper surface coated with an adhesive and positioned adjacent to the inlet opening so that the distance between the inlet opening and the adhesive-coated surface of the collection member is less than about 0.08 inches and the ratio of the distance between the inlet opening and the adhesive-coated surface of the collecting member to the diameter of the inlet opening is less than about 0.1, such that, when gas and particles are drawn from the source and through the housing, the inlet opening directs the gas and particles at the adhesive-coated surface of the collecting member for capturing particles on the surface of the collecting member.

8. A system for collecting particles from a source of gas and particles, the system comprising:
   a housing defining an enclosed chamber, the housing having a circular inlet opening providing fluid communication between the source of gas and particles and the chamber, and an outlet opening providing fluid communication between the chamber and the exterior of the housing;
   means for producing a fluid flow, the outlet opening adapted to be connected to the fluid flow producing means for drawing gas and particles from the source and through the housing from the inlet opening to the outlet opening; and
   a collecting member disposed in the chamber in the housing between the inlet opening and the outlet opening, the collecting member having an upper surface, at least a portion of the upper surface coated with an adhesive and positioned adjacent to the inlet opening so that the distance between the inlet opening and the surface of the collecting member is less than about 0.02 inches and the ratio of the distance between the inlet opening and the adhesive-coated surface to the diameter of the inlet opening is less than about 1, such that, when gas and particles are drawn from the source and through the housing, the inlet opening directs the gas and particles at the adhesive-coated surface of the collecting member for capturing particles on the surface of the collecting member.

9. A system for collecting particles from a source of gas and particles, the system comprising:
   a housing defining an enclosed chamber, the housing having a circular inlet opening providing fluid communication between the source of gas and particles and the chamber, and an outlet opening providing fluid communication between the chamber and the exterior of the housing;
   means for producing a fluid flow, the outlet opening adapted to be connected to the fluid flow producing means for drawing gas and particles from the source and through the housing from the inlet opening to the outlet opening; and
   a collecting member disposed in the chamber in the housing between the inlet opening and the outlet opening, the collecting member having an upper surface, at least a portion of the upper surface coated with an adhesive and positioned adjacent to the inlet opening so that the distance between the inlet opening and the adhesive-coated surface of the collection member is less than about 0.08 inches, and wherein the diameter of the inlet opening is less than about 0.2 inches and the ratio of the distance between the inlet opening and the adhesive-coated surface to the diameter of the inlet opening is less than about 1, such that, when gas and particles are drawn from the source and through the housing, the inlet opening directs the gas and particles at the adhesive-coated surface of the collecting member for capturing particles on the surface of the collecting member.

10. A method for collecting particles from a source of gas and particles, the method comprising the steps of:
    providing a housing defining an enclosed chamber, the housing having an inlet opening providing fluid communication between the source of gas and particles and the chamber, and an outlet opening providing fluid communication between the chamber and the exterior of the housing, the outlet opening adapted to be connected to a fluid flow producing means for drawing gas and particles trough the housing from the inlet opening to the outlet opening;
    providing a collecting member;
    coating at least a portion of the upper surface of the collecting member with an adhesive;
    positioning the collecting member in the chamber in the housing between the inlet opening and the outlet opening;
    providing a cap member having a pass through opening, the cap member adapted to be sealingly connected to the housing so that the pass through opening is in direct fluid communication with the inlet opening in the housing;
    providing a flexible hose connected at one end to the opening in the cap member; and
    drawing gas and particles from the source and through the hose and cap member and into the housing so that the inlet opening directs the gas and particles at the adhesive-coated surface of the collecting member.

11. A method of collecting particles as recited in claim 10, further comprising the step of providing a rigid tube connected to the free end of the hose.

12. A method for calibrating a particle collection apparatus including a housing defining an enclosed chamber, the housing having an inlet opening providing fluid communication between a source of gas and particles and the chamber, and an outlet opening providing fluid communication between the chamber and the exterior of the housing, the outlet opening adapted to be connected to a fluid flow producing means for drawing gas and particles through the housing from the inlet opening to the outlet opening, and a collecting member disposed in the chamber in the housing between the inlet opening and the outlet opening, the collecting member having at least a portion of an upper surface positioned adjacent to the inlet opening such that, when gas and particles are drawn from the source of gas and particles and through the housing, the inlet opening directs the gas and particles at the portion of the surface of the collecting member, the calibration method comprising the steps of:
    providing a cap member having a pass through opening, the cap member adapted to be sealingly connected to the housing so that the pass through opening is in direct fluid communication with the inlet opening in the housing;
    providing a flexible hose connected at one end to the opening in the cap member; and
    drawing gas and particles from the source and through the hose and cap member and into the inlet opening of the housing.

13. A particle collecting apparatus as recited in claim 1, wherein the housing defines a frusto-conical inlet passage tapering inwardly to the inlet opening.

14. A particle collecting apparatus as recited in claim 13, wherein the housing has an integral protruberance extending outwardly from the outer surface of the housing for defining the inlet passage.

15. A particle collecting apparatus as recited in claim 2, wherein the inlet opening is coplanar with the portion of the inner surface of the first portion of the housing defining the recess.

16. A system for collecting particles from a source of gas and particles, the system comprising:
- a housing defining an enclosed chamber, the housing having a circular inlet opening providing fluid communication between the source of gas and particles and the chamber, and an outlet opening providing fluid communication between the chamber and the exterior of the housing, wherein the housing defines a frusto-conical inlet passage tapering inwardly to the inlet opening;
- means for producing a fluid flow, the outlet opening adapted to be connected to the fluid flow producing means for drawing gas and particles from the source and through the housing from the inlet opening to the outlet opening; and
- a collecting member disposed in the chamber in the housing between the inlet opening and the outlet opening, the collecting member having an upper surface, at least a portion of the upper surface coated with an adhesive and positioned adjacent to the inlet opening so that the distance between the inlet opening and the adhesive-coated surface of the collection member is less than about 0.08 inches and the ratio of the distance between the inlet opening and the adhesive-coated surface to the diameter of the inlet opening is less than about 1, such that, when gas and particles are drawn from the source and through the housing, the inlet opening directs the gas and particles at the adhesive-coated surface of the collecting member for capturing particles on the surface of the collecting member.

17. A particle collecting system as recited in claim 16, wherein the housing has an integral protruberance extending outwardly from the outer surface of the housing for defining the inlet passage.

18. A system for collecting particles from a source of gas and particles, the system comprising:
- a housing comprising a first portion for sealingly connecting to a second portion, the inner surface of each of the first and second portions defining a recess and the walls of the first and second portions defining the recesses forming an enclosed chamber when the first and second portions are sealingly connected, the first portion of the housing having a circular inlet opening providing fluid communication between the source of gas and particles and the chamber, the inlet opening coplanar with the portion of the inner surface of the first portion of the housing defining the recess, and the second portion of the housing having an outlet opening providing fluid communication between the chamber and the exterior of the housing;
- means for producing a fluid flow, the outlet opening adapted to be connected to the fluid flow producing means for drawing gas and particles from the source and through the housing from the inlet opening to the outlet opening; and
- a collecting member disposed in the chamber in the housing between the inlet opening and the outlet opening, the collecting member having an upper surface, at least a portion of the upper surface coated with an adhesive and positioned adjacent to the inlet opening so that the distance between the inlet opening and the adhesive-coated surface of the collection member is less than about 0.08 inches and the ratio of the distance between the inlet opening and the adhesive-coated surface to the diameter of the inlet opening is less than about 1, wherein the longest planar dimension of the recesses at the inner surface of the first and second portions of the housing being less than the longest dimension of the collecting member so that the inner surfaces of the first and second portions engage the collecting member at two spaced points when the first and second portions are sealingly connected, such that, when gas and particles are drawn from the source and through the housing, the inlet opening directs the gas and particles at the adhesive-coated surface of the collecting member for capturing particles on the surface of the collecting member.

19. An apparatus for collecting particles entrained in a gas from a source of gas and particles, the apparatus comprising:
- a housing including a first portion for sealingly connecting to a second portion, each of the first and second portions having a planar inner surface and a recess formed therein, the inner surfaces of the first and second portions defining an enclosed chamber when the first and second portions are sealingly connected, the first portion having an inlet opening into the recess in the first portion and providing fluid communication between the source of gas and particles and the chamber, and the second portion having an outlet opening into the recess in the second portion and providing fluid communication between the chamber and the exterior of the housing, the outlet opening adapted to be connected to a fluid flow producing means for drawing gas and particles through the housing from the inlet opening to the outlet opening; and
- a collecting member disposed in the chamber in the housing between the inlet opening and the outlet opening, wherein the longest planar dimension of the recesses at the inner surface of the first and second portions being less than the longest dimension of the collecting member so that the inner surfaces of the first and second portions engage the collecting member at two spaced points, the collecting member having an upper surface, at least a portion of the upper surface coated with an adhesive and positioned adjacent to the inlet opening so that when gas and particles are drawn from the source of gas and particles and through the housing, the inlet opening directs the gas and particles at the adhesive-coated surface of the collecting member for capturing the particles, wherein the inner surface of the second portion further defines opposed slots extending radially outwardly of the recess for receiving the collecting member, and wherein the depth of the slots is less than the thickness of the collecting member so that the inner surface of the first portion engages a portion of the collecting member when sealingly connected to the second portion.

20. An apparatus for collecting particles as recited in claim 2, wherein the first portion comprises an internally-threaded peripheral flange and the peripheral surface of the second portion is threaded for receiving the first portion in a sealing connection.

21. An apparatus for collecting particles as recited in claim 2, further comprising an o-ring disposed in a groove in the inner surface of the first portion or the second portion outwardly of the recess for providing a seal between the inner surfaces of the first and second portions.

22. An apparatus for collecting particles entrained in a gas from a source of gas and particles, the apparatus comprising:

a housing defining an enclosed chamber, the housing having an inlet opening providing fluid communication between the source of gas and particles and the chamber, and an outlet opening providing fluid communication between the chamber and the exterior of the housing, the outlet opening adapted to be connected to a fluid flow producing means for drawing gas and particles through the housing from the inlet opening to the outlet opening;

a collecting member disposed in the chamber in the housing between the inlet opening and the outlet opening, at least a portion of an upper surface of the collecting member positioned adjacent to the inlet opening such that, when gas and particles are drawn from the source of gas and particles and through the housing, the inlet opening directs the gas and particles at the portion of the upper surface of the collecting member; and a cap member having a pass through opening, the cap member adapted to be sealingly connected to the housing so that the pass through opening is in direct fluid communication with the inlet opening in the housing;

a flexible hose connected at one end to the opening in the cap member; and a rigid tube connected to the free end of the hose.

23. A particle collection apparatus as recited in claim 22, wherein the housing has an integral protuberance extending upwardly from the outer surface of the housing and defining an inlet passage tapering inwardly to the inlet, and the cap member includes a peripheral flange defining a cavity for sealingly receiving the protuberance.

24. A particle collection apparatus as recited in claim 23, further comprising an o-ring disposed around the protuberance or in the peripheral flange of the cap member for sealing the connection between the protuberance and the cap member.

* * * * *

UNITED STATES PATENT AND TRADEMARK OFFICE
CERTIFICATE OF CORRECTION

| | | |
|---|---|---|
| PATENT NO. | : 7,135,060 B2 | Page 1 of 1 |
| APPLICATION NO. | : 10/723980 | |
| DATED | : November 14, 2006 | |
| INVENTOR(S) | : John L. Jordan, Sr. et al. | |

It is certified that error appears in the above-identified patent and that said Letters Patent is hereby corrected as shown below:

Column 12, Line 10
Change "trough" to -- through --

Signed and Sealed this

Twenty-seventh Day of February, 2007

JON W. DUDAS
*Director of the United States Patent and Trademark Office*